UNITED STATES PATENT OFFICE.

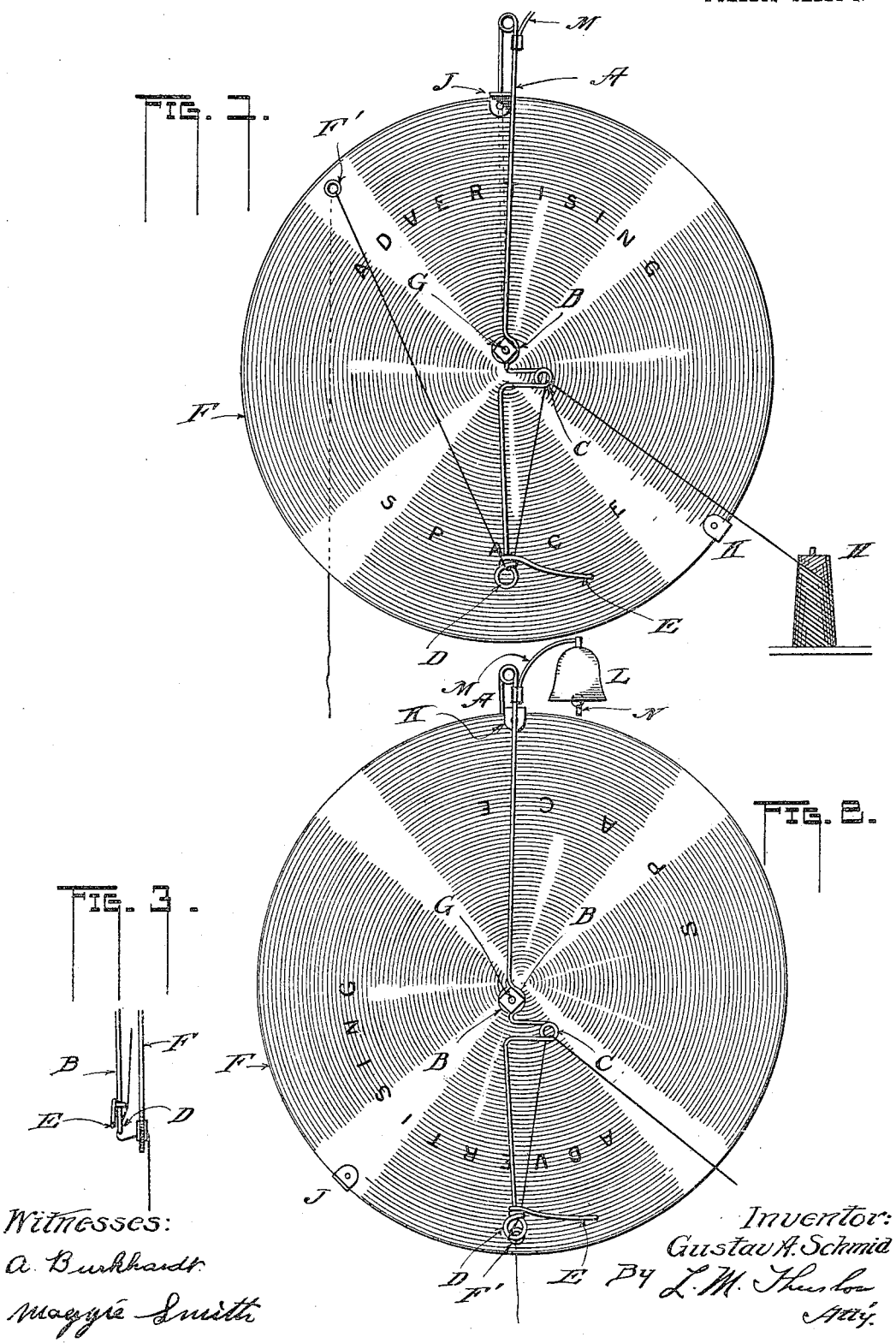

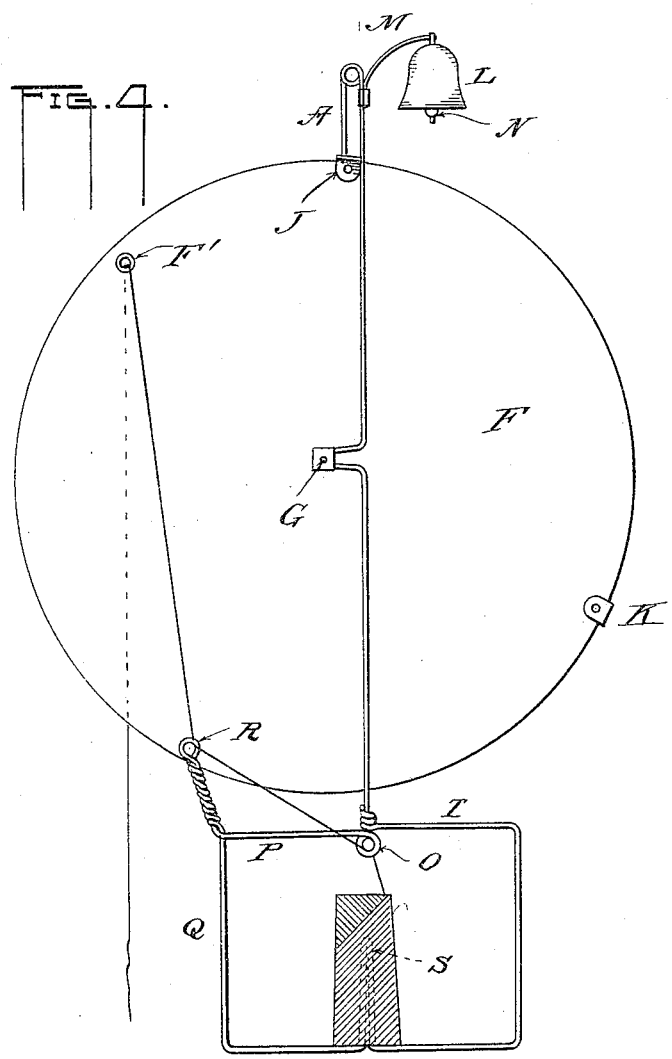

GUSTAV A. SCHMID, OF PEORIA, ILLINOIS, ASSIGNOR OF ONE-HALF TO CHARLES E. ULRICH, OF PEORIA, ILLINOIS.

TWINE-CARRIER.

949,963.  Specification of Letters Patent.  Patented Feb. 22, 1910.

Application filed January 2, 1909.  Serial No. 470,365.

*To all whom it may concern:*

Be it known that I, GUSTAV A. SCHMID, citizen of the United States, residing at Peoria, in the county of Peoria and State of Illinois, have invented certain new and useful Improvements in Twine-Carriers; and I do hereby declare that the following is a full, clear, and exact description of the invention, which will enable others skilled in the art to which it appertains to make and use the same.

This invention pertains to improvements in twine carriers and relates more particularly to a device to suspend the twine above store counters.

An object of the invention is to provide a device of the class described arranged so that the twine on being released at the counter will be drawn upward a considerable distance so that it will be entirely out of the way.

Another object is to provide a twine holder part of which is revoluble and so arranged that its movement will lift the twine from the counter substantially equal to twice the distance through which it moves.

Another object is to provide a twine carrier having a member of considerable surface area upon which advertising matter can be displayed said twine carrier thus serving as an excellent advertising medium.

A further object is to provide a disk eccentrically mounted upon a pivot so that when the twine is drawn down for use the heaviest side of the disk will be raised and then when released the disk in regaining its normal position by the force of gravity the twine will be raised a distance equal to substantially twice the distance traveled by the said disk in reaching its normal position.

Another object is to provide an advertising display device in the form of a twine carrier and combine therewith an alarm device to attract attention thereto each time it is used.

Other objects will appear in the following description.

In the appended drawing: Figure 1 is an elevation of my improved twine holder in its normal position or the position it occupies when at rest. Fig. 2 is a similar view showing its position when the twine is being drawn therefrom. Fig. 3 is an elevation of a portion of the device as seen edgewise. Fig. 4 is a modified form of the twine holder showing a slightly different arrangement.

A indicates a frame to be suspended from the ceiling, for instance, and preferably of wire having two parallel legs each of which has an eye B disposed opposite one another but one of which is shown. One of the legs terminates at its eye B while the other is provided with an extension near its eye in which is a second eye C, the wire thence extending downward and provided at some little distance below the eye B with an eye or loop D, the extremity of the leg thence extending in a substantially horizontal direction to form the extension E the purpose of which will be described later.

The particular location of the eye C with reference to the eye B is not important but for convenience it is removed therefrom substantially as shown and also to keep the twine which is intended to extend therethrough clearly in view. Placed between the two legs is a disk F of cardboard, metal or other desired material. A bolt G extends through both the eyes B and through the disk and forms a pivot for the latter. The said disk is eccentrically mounted upon the said pivot in that the bolt does not extend through its true center but, as shown in Fig. 1 passes through it at a point a little above the center so that there will be a heavy and a light zone as may be understood by a glance at the drawing so that its normal position when at rest is with the heavy zone lying beneath the pivot. At some suitable place for instance at H is a ball of twine one of whose ends is carried through the eye C thence through the eye D and an eyelet F' in the disk F from which the end of the twine is suspended over the counter. On the periphery of the disk are stops J and K the former being placed upon that side of the disk having the least weight and the latter upon the heavy side. Each stop is provided with an extension substantially perpendicular to the plane of the disk and so disposed that one of them limits the movement of the disk in one direction, see Fig. 1, and the opposite one limits the movement in the opposite direction, see Fig. 2. By drawing the end of the twine down as it hangs from the disk the latter is revolved on its axis to raise the heavy zone of the disk until the stop K meets one of the legs of the frame. Having reached this position the eyelet F' of the disk is in the immediate vicinity of the eye D at the lower end of the frame. When the twine is released at the counter the heavy side of the disk immediately descends with the result that the eyelet F' is returned to its first or normal position the stop J determining its position of rest by meeting the leg as in Fig. 1.

It will be noted that since the eye D depends below the pivot point of the disk and that the eyelet F' is carried upward therefrom as the disk moves to its normal position the end of the twine will be raised from the counter substantially twice the distance traveled by the said eyelet from its lower to its upper position. This may be better understood by stating that as the eyelet rises the twine slips therethrough since there is less resistance to its passage thus than in drawing it from the ball H through the several eyelets in the frame; a plurality of the latter being provided for the desired friction to obtain a resistance to the passage of twine so that the free end of the twine will be raised as described. Now since the twine passes through the eye D which is near the bottom of the disk, the eyelet as it moves upward therefrom will raise the twine a distance equal to the distance between the eyes to position of the eyelet F at rest and in addition to this it will also be raised a distance equal to that just named since the twine having slipped through the eyelet to make up the first distance described must also lift the twine.

I have shown means for attracting attention to the twine carrier which consists of a bell L mounted preferably upon a flexible arm M secured to the frame of the device.

The clapper N lies in the path of the stop K and is struck thereby when and as the disk is moved on its pivot and in striking the clapper the bell is vibrated on its arm M and the attention of the customer is thus drawn to the twine holder and as the disk is provided with advertising matter the customer's attention is of course drawn to the thing advertised. The device therefore serves as a convenient and handy twine carrier besides an excellent medium of advertising.

I do not of course care to be confined necessarily to the exact structure shown as to the form of the suspending frame nor to the manner of carrying the alarm device neither do I wish to confine myself to the outline of disk shown since it may be varied in shape to suit the desires of the advertiser so long as a weighted portion thereof is employed. The extension E of the frame is used to prevent loops of twine becoming knotted in the eye D or eyelet F' that may be suddenly drawn from the ball H and which may have passed through the eye C. The said extension is designed to catch the loop and hold it until the twine is gradually drawn out.

In Fig. 4 a slightly modified form of the device is illustrated. One of the legs of the frame is extended downward and has an eye O and an extension P of the wire is twisted together with an extension Q and an eye R formed at the end answers in the same capacity as the eye D of the other figures. An extension S is formed also by bending the wire upward and this receives the twine ball while the extremity T of the wire is then coiled around the leg of the frame above the eye O. A frame is thus provided for carrying the twine so that a separate twine holder is unnecessary.

The advantages in my form of twine carrier are first, that by employing the disk a large advertising space is possible; second, that the twine is raised a considerable distance above the counter in a short movement of the disk; third that an alarm is sounded and draws the attention of the customer to the advertising and fourth that provision is made to prevent the bunching of twine before it passes to the disk so that there will be no strain on the latter.

Having thus described my invention, I claim:—

1. A twine carrier consisting of a supporting frame, a disk pivotally mounted thereon, its pivot lying outside its center of gravity whereby it has a light and a heavy zone, a stop carried by the disk in each of its zones and adapted to meet the frame to limit the movement of said disk, there being an eye in the outer margin of the disk in its light zone, the frame having an eye through which the twine extends from its source and thence through the said eye of the disk, the disk adapted when the twine is drawn through its eye to approach and lie adjacent to the eye in the frame for the purposes set forth.

2. In a twine carrier the combination of a frame, a substantially circular member having a substantially flat surface to receive advertising matter and pivotally supported on said frame said member provided with a light and a heavy zone, the frame having provision near the lower edge of the member through which to pass the twine, there being provision in the disk at the portion thereof which is normally its top through which also to pass said twine.

3. In a twine carrier the combination of a substantially circular disk to carry advertising matter, a frame on which the disk is eccentrically and revolubly mounted, an eye carried by the frame near the lower edge of the disk through which to pass the twine, there being provision in the disk in the part normally its top through which also to pass the twine, and members carried by the disk and adapted to meet the frame for limiting the movement of said disk in each direction of revolution.

4. In a twine carrier the combination of a disk, a frame upon which the disk is eccentrically mounted, there being provision in the frame near the pivot of the disk through which to pass the twine there also being provision in the frame near the lower edge of the disk through which to pass the twine, there being provision in the top portion of the disk when the latter is in its normal position through which also to pass the twine, and means to limit the rotary movement of the disk in both directions.

5. A twine carrier consisting of a frame, a disk pivotally mounted thereon, its pivot lying outside its center of gravity, whereby it has a light and a heavy zone, a stop carried by the disk in each of its zones and adapted to meet the frame in the movement of said disk, an extension on the frame to carry a ball of twine, there being an eye in the frame adjacent to the lower margin of the disk through which the twine extends, there also being an eye in the margin of the light zone of the disk through which the end of the twine extends, said disk adapted when the twine is pulled therefrom to turn and its eye to approach the position of the eye of the frame and lie adjacent thereto for the purposes set forth.

In testimony whereof I affix my signature, in presence of two witnesses.

GUSTAV A. SCHMID.

Witnesses:
L. M. THURLOW,
E. J. ABERSOL.